United States Patent [19]

Takeshita et al.

[11] 4,222,613
[45] Sep. 16, 1980

[54] PRESSURE CONTROL VALVE ASSEMBLY FOR BRAKE SYSTEMS

[75] Inventors: Hiroshi Takeshita, Chiryu; Takashi Nagashima, Toyota; Hiroyuki Kondo, Anjo, all of Japan

[73] Assignee: Aisin Seiki Kabushiki Kaisha, Kariya, Japan

[21] Appl. No.: 24,257

[22] Filed: Mar. 27, 1979

[30] Foreign Application Priority Data

Mar. 27, 1978 [JP] Japan .................................. 53-35017

[51] Int. Cl.³ .............................................. B60T 13/00
[52] U.S. Cl. ..................................... 303/6 C; 188/349
[58] Field of Search ......................... 303/6 C; 188/349

[56] References Cited

U.S. PATENT DOCUMENTS

| 3,459,000 | 8/1969 | Oberthür | 303/6 C |
| 3,976,334 | 8/1976 | Farr | 303/6 C |
| 4,026,607 | 5/1977 | Hess et al. | 303/6 C |

FOREIGN PATENT DOCUMENTS 987689  3/1965  United Kingdom .................... 303/6 C Primary Examiner—Douglas C. Butler
Attorney, Agent, or Firm—Finnegan, Henderson, Farabow, Garrett & Dunner

[57] ABSTRACT

A pressure control valve assembly in a split brake system having two separate pressure lines comprises two valve pistons subjected to pressure from separate pressure sources so as to control the outlet pressure admitted to the respective rear wheel brakes. The valve assembly further comprises two movable members each in alignment with each of two valve pistons and subjected to the pressure of two pressure lines at each end thereof and two springs each interposed between a respective piston and movable member for normally urging the piston in the valve closing direction. The hydraulic failure of one of two pressure lines causes the movable member to move in the direction wherein no biasing force of the spring may be imparted to the valve piston.

5 Claims, 2 Drawing Figures

PRESSURE CONTROL VALVE ASSEMBLY FOR BRAKE SYSTEMS

BACKGROUND OF THE INVENTION

This invention generally relates to a pressure control valve assembly for use in vehicle braking systems and more particularly to improvements in a pressure control valve assembly for controlling the fluid pressure in wheel brakes of the split braking system.

For instance, in order to reduce the increase of the hydraulic brake pressure in rear wheel brakes with respect to the increase of the hydraulic pressure in the front wheel brakes or brake master cylinder there has been proposed a pressure control valve assembly for avoiding locking of the rear wheel. When the brake system has separate pressure sources such as a split master cylinder, it is necessary to control the brake pressure in each independent pressure line.

The conventional pressure control valve assembly for use in split braking system is provided with means for compensating for hydraulic failure in one of the pressure lines by disabling or by-passing the control valve operation in the other pressure line.

These valve assemblies are not free from other problems, i.e., the construction thereof is complicated and they are large in size so that it is difficult to install the control valve assembly in the limited space available in vehicles.

SUMMARY OF THE INVENTION

One of the objects of the present invention is, accordingly, to provide a pressure control valve asembly which may obviate the drawbacks of the conventional valve assembly.

Another object of the invention is to provide a pressure control valve assembly wherein means responsive to the hydraulic failure of one of the pressure lines is provided for retarding the valve operation in the other pressure line thereby compensating for said hydraulic failure.

A further object of the present invention is to provide a pressure control valve assembly which is simple in construction and easy to assemble.

DETAILED EXPLANATION OF THE INVENTION

Figure 1:
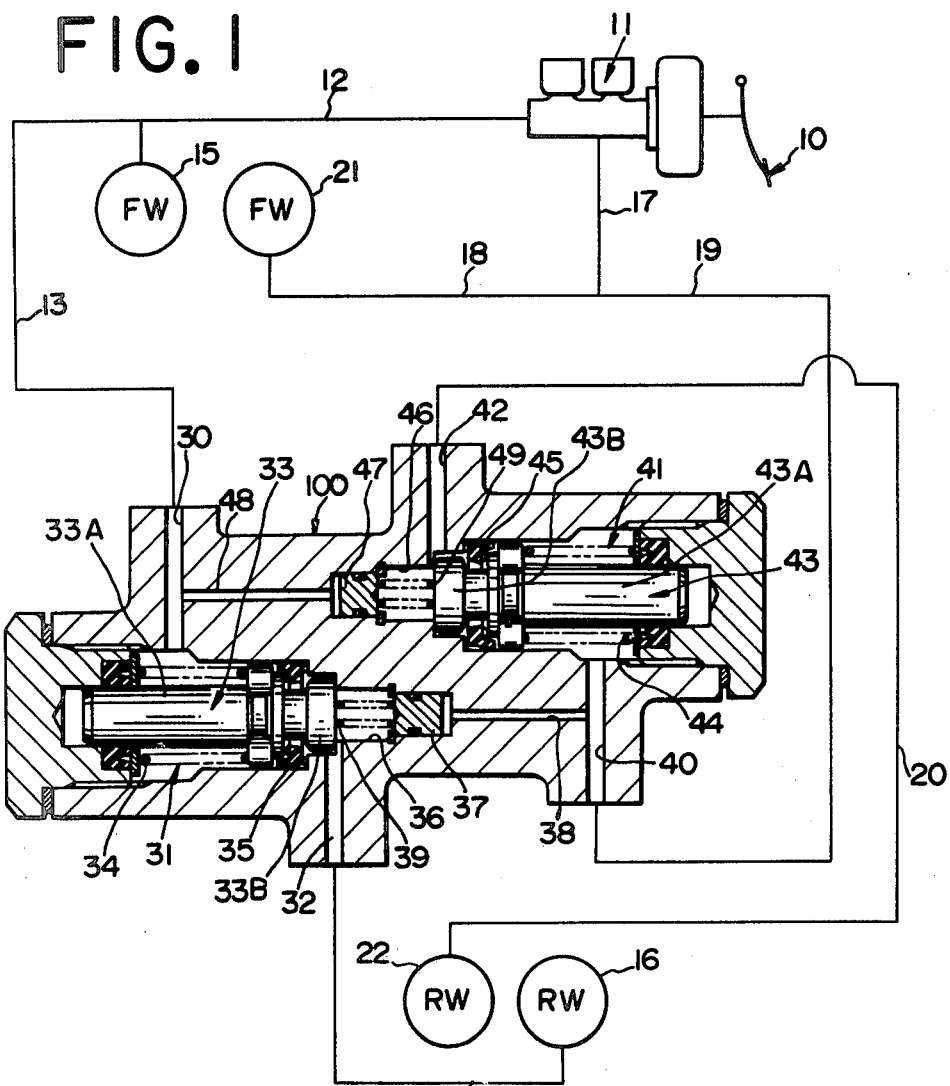
FIG. 1 is a cross-sectional view of one embodiment in accordance with the present invention.

Referring now to the drawings, a split brake master cylinder 11 to be actuated by a foot pedal 10 comprises a first pressure line including conduits 12, 13, and 14 and a second pressure line including conduits 17, 18, 19 and 20. The first pressure line permits fluid communication between the left front wheel brake 15 and the right rear wheel brake 16 while the second pressure line permits fluid communication between the right front wheel brake 21 and the left rear wheel brake 22, thereby constituting a "diagonal" pressure line.

A pressure control valve assembly 100 is disposed in the first and the second pressure lines so as to control the fluid pressure in the rear wheel brakes 16 and 22.

The valve assembly 100 is provided with a first inlet port 30 in fluid communication with conduit 13 of the first pressure line, a first pressure control valve 31, and a first outlet port 32 in fluid communication with conduit 14 for admitting the fluid pressure regulated by the first valve 31 to the right rear wheel brake 16.

The first valve 31 comprises a stepped piston 33 having a reduced diameter portion 33A normally subjected to the pressure in the inlet port 30 and a larger diameter portion 33B normally subjected to the pressure in the outlet port 32, a spiral spring 34 normally urging the piston 33 to the right, as seen in FIG. 1, and a valve seat 35 cooperating with the larger diameter portion 33B of the piston 33 to control the fluid communication between the first inlet port 30 and the first outlet port 32.

Similarly, the valve assembly 100 is provided with a second inlet port 40 in fluid communication with conduit 19 of the second pressure line, a second pressure control valve 41 in fluid communication with second inlet port 40, and a second outlet port 42 in fluid communication with conduit 20 for admitting the fluid pressure regulated by the second valve 41 to the left rear wheel brake 22. The second valve 41 comprises a stepped piston 43 having a reduced diameter portion 43A normally subjected to the pressure in the second inlet port 40 and a larger diameter portion 43B normally subjected to the pressure in the second outlet port 42, a spiral spring 44 normally urging the piston 43 to the left, as seen in FIG. 1, and a valve seat 45 cooperating with the larger diameter portion 43B of the piston 43 to control the fluid communication between the inlet port 40 and the outlet port 42.

At the right of the stepped piston 33 of the first control valve 31 a first fluid chamber 36 is formed, within which a first slidable member 37 is sealingly fitted in alignment with the stepped piston 33 to place conduit 14 through the first outlet port 32 at the left side thereof in fluid communication with the second inlet port 40 through an axial passage 38 at the right side thereof. A coiled spring 39 is disposed in the first fluid chamber 36 between the larger diameter portion 33B of the first piston 33 and the left end of the first slidable member 37. The first slidable member 37 may be moved due to the biasing force of the coiled spring 39 and the pressure differential between the first outlet port 32 and the second inlet port 40.

Similarly, at the left of the stepped piston 43 of the second control valve 41 is formed a second fluid chamber 46 within which a second movable member 47 is sealingly fitted in alignment with the piston 43 to place second inlet port 42 at the right end thereof in fluid communication with the first inlet port 30 through an axial passage 48 at the left end thereof. A coiled spring 49 is disposed in the chamber 46 between the larger diameter portion 43B of the piston 43 and the right end of the member 47. Thus, the second slidable member 47 will be moved due to the biasing force of the spring 49 and the pressure differential between the first inlet port 30 and the second outlet port 42.

Figure 2:
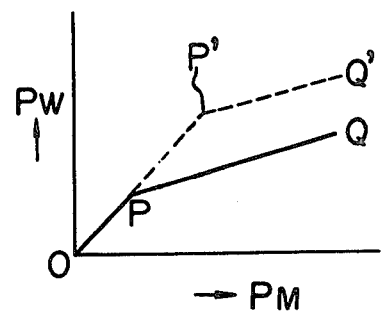
FIG. 2 is a graph showing the brake pressure characteristics according to the present invention.

Upon normal brake operation, the fluid pressure characteristics in the rear wheel brakes 16 and 22 may be illustrated by the solid line O—P—Q in FIG. 2. More specifically, the rear wheel brake pressure $P_W$ is proportional to the master cylinder pressure $P_M$ before the point P. The pressure increase in the master cylinder 11 after the point P activates each of the first and the second control valves 31 and 41 so as to lower the pressure increase in the wheel brakes with respect to the pressure increase in the master cylinder. The gradient of the line P-Q will be determined by the biasing force of the spiral springs 34 and 44 minus the biasing force of the coiled springs 39 and 49, respectively.

Upon the hydraulic failure of, for instance, the second pressure line including the conduits 17, 18 and 19, little or no pressure is supplied to the second inlet port 40 and the axial passage 38, thereby causing the pressure differential between both sides of the first movable member 37. Thus, the first member 37 is moved right to increase the capacity of the first fluid chamber 36 at the left of the member 37 thereby decreasing or making the biasing force of the coiled spring 39 ineffectual. Consequently, only the spiral spring 34 determines the deflecting point of the rear wheel brake 16 up to P' (FIG. 2), thereby compensating for the pressure loss of the second pressure line as shown by the dotted line O—P'—Q' in FIG. 2. It will be seen without detailed explanation that the hydraulic failure of the first pressure line may be similarly compensated for by the pressure in the second pressure line.

While it will be apparent that the preferred embodiment of the invention disclosed is well calculated to fulfill the objects above stated, it will be appreciated that the invention is susceptible to modification, variation and change.

What is claimed is:

1. A pressure control valve assembly for use in split brake systems having separate pressure lines, comprising in combination:
    an inlet port in fluid communication with one of said pressure lines;
    a valve subjected to the pressure in said inlet port to control the pressure in an outlet port in fluid communication with one of the wheel brakes and including
    a stepped piston,
    a valve seat for cooperating with said stepped piston to control communication between said inlet port and outlet port, and
    a first spring for normally urging said stepped piston in the direction wherein said inlet port is in fluid communication with said outlet port thereby controlling the pressure increase of said wheel brake,
    a slidable member sealingly fitted in alignment with said stepped position and subjected to the pressure in said outlet port at one end thereof while under the pressure of the other pressure line at the other end thereof,
    a fluid chamber formed between said stepped piston and said slidable member and normally connected to said outlet port, and
    a second spring disposed in said fluid chamber for normally urging said stepped piston in the direction opposite to the biasing force of said first spring,
    whereby the biasing force of said second spring is made ineffectual upon the hydraulic failure of said other pressure line to impart the additional biasing force of said first spring on said stepped piston.

2. A pressure control valve assembly as set forth in claim 1 further comprising a second inlet port in fluid communication with said other pressure line, a second valve provided with a third spring and subjected to the pressure in said second inlet port to control the pressure in a second outlet port in fluid communication with the other wheel brakes, a second slidable member sealingly fitted in alignment with said second valve, a second fluid chamber normally connected to said second outlet port, and a fourth spring disposed in said second fluid chamber for normally urging said second valve in the direction opposite to the biasing force of said third spring.

3. A pressure control valve assembly as set forth in claim 2 further comprising means for fluid communication between said first inlet port and said second slidable member and means for fluid communication between said second inlet port and said first mentioned slidable member thereby permitting said second and fourth springs to impart the biasing force to said respective valves.

4. A pressure control valve asembly as set forth in claim 2 wherein each of said slidable members is sealingly fitted in each of said fluid chambers.

5. A pressure control valve assembly as set forth in claim 2 wherein said separate pressure lines are arranged to form a diagonal split brake system.

* * * * *